UNITED STATES PATENT OFFICE.

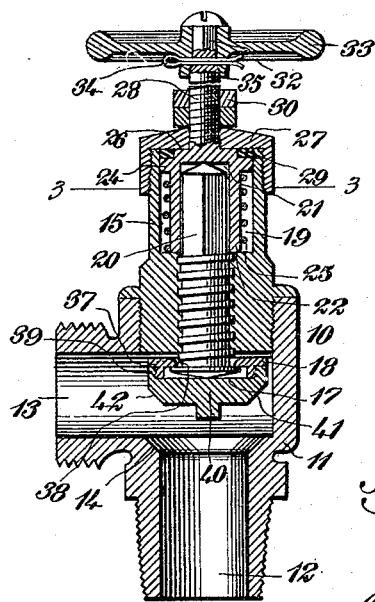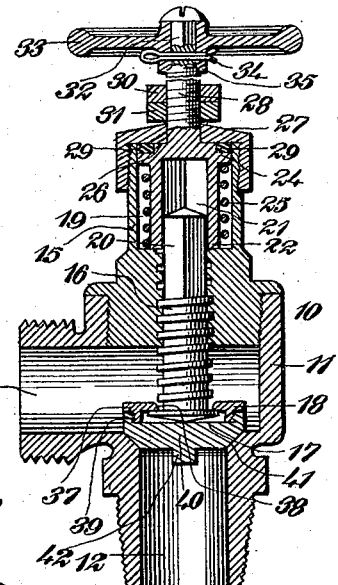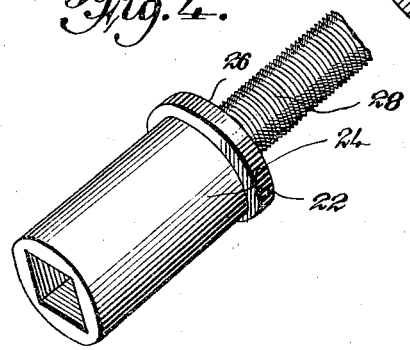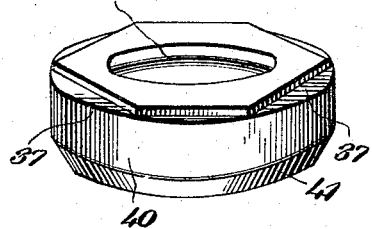

LOUIS DECK, OF FORT WAYNE, INDIANA.

VALVE.

1,185,382.　　　　Specification of Letters Patent.　　Patented May 30, 1916.

Application filed January 22, 1913.　Serial No. 743,619.

*To all whom it may concern:*

Be it known that I, LOUIS DECK, a citizen of the United States, residing at Fort Wayne, in the county of Allen and State of Indiana, have invented new and useful Improvements in Valves, of which the following is a specification.

The invention relates to valves, and has for an object to provide a valve which can be locked in open or closed position and which operates with the minimum amount of friction and which is arranged and constructed to prevent leaking.

The invention embodies, among other features, a valve which includes a minimum amount of packing and in which a number of the parts are made of a solid material such as metal and which will not readily wear out and cause the valve to leak.

The invention still further embodies a valve which can be readily operated with a minimum amount of friction and in which the valve stem for moving the valve member on to or off of the seat thereof is a separate element in respect to the key of the valve which, however, operates the valve stem and which is capable simply of rotation, whereas the valve stem, when rotated, is advanced or retarded in the valve casing.

In the further disclosure of the invention reference is to be had to the accompanying drawings, constituting a part of this specification, in which similar characters of reference denote corresponding parts in all the views and in which:

Figure 1 is a vertical sectional view of the valve, showing the same in open position; Fig. 2 is a similar view showing the valve in closed position; Fig. 3 is a horizontal sectional view taken on the line 3—3 in Fig. 1. Fig. 4 is a fragmentary perspective view of the key, parts being broken away to disclose the underlying structure; and Fig. 5 is a perspective view of the disk of the valve member.

Referring more particularly to the views, I employ a valve 10 comprising a valve casing 11 having an inlet 12 and an outlet 13, a valve seat 14 being formed in the casing 11 between the inlet 12 and outlet 13 thereof.

A bonnet 15 has threaded connection with the casing 11 and a valve stem 16 has threaded connection with the bonnet, with the lower end of the valve stem terminating in an apex 17 and having an annular flange 18 formed adjacent the said apex, the said lower end of the valve stem being adapted to depend in the valve casing. The upper end of the valve stem projects into a chamber 19 formed in the upper end of the bonnet 15 and terminates in a squared shank 20, which is received in a squared chamber 21 formed in the lower end of a key 22 mounted to rotate in the chamber 19 of the bonnet 15, the upper end of the squared shank 20 terminating in a point forming an apex 23 and which engages the inner wall of the key 22, as shown.

The key 22 is spaced from the wall of the chamber 19 and is provided with an annular flange 24, an expansible helical spring 25 being arranged in the chamber 19, with one end of the spring abutting against the flange 24 and the other end of the spring seating on the bonnet 15, within the chamber 19, it being readily seen by referring to the views that the mentioned spring encircles the lower end of the key 22. The key 22 is provided with an integral annular seat 26 which abuts against a cap 27 having threaded connection with the bonent 15 and through which a threaded shank 28, integral with the key 22 and forming a part thereof, extends, a suitable packing 29 being preferably interposed between the cap 27 and the annular flange 24 to prevent leakage at the point of formation of the seat 26 on the key 22 and at which point the shank of the key passes through the cap 27.

A plurality of independently operable lock nuts 30 and 31 have threaded connection with the threaded portion of the shank 28 and it will be readily seen that when the lock nut 30 is screwed down on the shank to engage the cap 17 and the lock nut 31 then screwed down on to the lock nut 30, the key 22 will be held in rigid and locked position relatively to the bonnet 15, and the valve stem 16, thus locking the valve stem with respect to the bonnet. The upper end of the shank 28 of the key 22 terminates in a squared reduced portion 32 supporting an operating wheel 33 and a cotter pin 34 is passed through an integral annular flange 35 formed with the wheel 33 and through the squared portion 32 to secure the wheel on the upper end of the key 22, it being readily seen that by mounting the cotter pin in the manner mentioned, that the wheel 33 can be operated without bringing the hands or clothing of the operator in contact with the cotter pin and which, if the cotter pin were unduly exposed, would result in the operator's clothing becoming torn or scratching the hand of the operator on contact with the free, ragged ends of the cotter pin.

As mentioned heretofore, the lower end of the valve stem 16 is provided with an annular integral flange 18 and a nut 37 is supported on the flange 18, the said nut having an inwardly extending circular flange 38 reposing upon the flange 18 as shown, the said nut having an integral reduced annular portion 39 threaded to receive and support a disk 40, the said disk being provided with a beveled surface 41 adapted to engage the seat 14 formed in the valve casing 11, it being readily seen that the nut 37 and disk 40, together with the flange 18, on the lower end of the valve stem, constitute a valve member 42 and which, when the disk 40 engages the valve seat, closes the inlet 12 of the valve casing 11.

Now assuming that the valve is in closed position, when it is desired to open the same rotation is imparted to the wheel 33, thus rotating the key 22 in the chamber 19 of the bonnet 15, and the rotation of the key 22 will result in the rotation of the valve stem 16, thus moving the valve stem vertically in the bonnet 15 and unseating the disk 40 from the valve seat 14 to open the inlet 12 and permit fluid to pass through the valve casing and out through the outlet 13, it being further seen that the spring 25 at all times retains the seat 26 in engagement with the cap 27 and which, with the provision of the packing 29, prevents leakage at the point where the shank of the valve key passes through the cap 27. Now when the valve member has been opened to the desired position, the lock nuts 30 and 31 can be moved into locked position on the shank of the valve key, with the lock nut 30 engaging the cap 27 and the lock nut 31 engaging the lock nut 30, thus locking the key in rigid position relatively to the bonnet and thus also locking the valve stem in rigid position to prevent accidental displacement of the valve member 42. It will be further noted that the length of the shank of the key is restricted so that there is but a slight portion of the shank exposed when the lock nuts 30 and 31 are threadedly mounted on the shank, it being thus seen that the provision of the lock nuts will tend to increase the strength of the shank of the key and prevent accidental bending or binding of the key at this point.

By providing the flange 18 and supporting the disk 40 on the valve stem through the medium of the nut 37, the disk 40 will be balanced on the lower end of the valve stem and the only point of contact of the valve stem with the disk is at the apex 17, thus minimizing the friction between the valve stem and the disk so that the disk can readily and properly seat upon the seat 14 in the valve casing 11, it being further seen that by forming the apex 23 on the upper end of the valve stem the friction between the valve stem and the key at this point will also be minimized and in view of this construction a slight rotation of the key will result in the immediate and positive operation of the valve stem without causing any binding of the valve stem relatively to the bonnet and, furthermore, greatly reducing the wear of the disk 40 upon the seat 14.

Having thus described my invention, I claim:

In a valve, in combination, a casing, a valve bonnet mounted thereon, said bonnet having a bore therethrough, the inner portion of said bore being threaded, the remaining portion of said bore being cylindrical and of larger diameter than said threaded portion whereby to provide an annular plane shoulder, a valve stem threaded in the threaded portion of said bore, a valve carried at the lower end of said valve stem, a squared shank formed upon said valve stem, a key of lesser diameter than said cylindrical portion of the bore, said key having an internal polysided bore in which said squared shank is arranged for slidable movement, a flange formed integrally upon said key and fitting snugly within said valve bonnet at its upper portion, said key resting upon said shoulder, said flange being disposed below the outer end of said key and terminating short of the outer end of said valve bonnet, a spring coiled around said key and engaging said flange and said shoulder, a packing mounted upon said flange and surrounding said key, a cap threadedly engaging said valve bonnet and adapted to engage said key to cause the latter to engage said shoulder, a stem upon said key projecting beyond said cap, and an operating handle mounted upon said last named stem.

In testimony whereof I affix my signature in presence of two witnesses.

LOUIS DECK.

Witnesses:
August Schiffle,
Harry B. Keller.